US012698413B2

(12) United States Patent
Zhu et al.

(10) Patent No.: US 12,698,413 B2
(45) Date of Patent: Aug. 4, 2026

(54) AQUEOUS POLYURETHANE-UREA DISPERSION

(71) Applicant: Covestro Deutschland AG, Leverkusen (DE)

(72) Inventors: Yingdan Zhu, Shanghai (CN); Huimin Ye, Shanghai (CN); Shifeng Tang, Shanghai (CN); Mingming Yu, Shanghai (CN); Yuan Li, Shanghai (CN); Hongliang Song, Shanghai (CN); Changjing Jiang, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 243 days.

(21) Appl. No.: 18/688,427

(22) PCT Filed: Aug. 26, 2022

(86) PCT No.: PCT/EP2022/073752
§ 371 (c)(1),
(2) Date: Mar. 1, 2024

(87) PCT Pub. No.: WO2023/031029
PCT Pub. Date: Mar. 9, 2023

(65) Prior Publication Data
US 2024/0368425 A1 Nov. 7, 2024

(30) Foreign Application Priority Data

Sep. 2, 2021 (CN) .......................... 202111029317.4
Oct. 27, 2021 (EP) ..................................... 21204936

(51) Int. Cl.

| | |
|---|---|
| C09D 175/12 | (2006.01) |
| C08G 18/10 | (2006.01) |
| C08G 18/34 | (2006.01) |
| C08G 18/38 | (2006.01) |
| C08G 18/42 | (2006.01) |
| C08G 18/44 | (2006.01) |
| C08G 18/66 | (2006.01) |
| C08G 18/72 | (2006.01) |
| C08G 18/73 | (2006.01) |
| C08G 18/75 | (2006.01) |
| C09D 11/102 | (2014.01) |
| C09D 11/30 | (2014.01) |
| C09D 175/02 | (2006.01) |

(52) U.S. Cl.
CPC ........... C09D 175/12 (2013.01); C08G 18/10 (2013.01); C08G 18/348 (2013.01); C08G 18/3857 (2013.01); C08G 18/4238 (2013.01); C08G 18/4277 (2013.01); C08G 18/44 (2013.01); C08G 18/6659 (2013.01); C08G 18/722 (2013.01); C08G 18/73 (2013.01); C08G 18/755 (2013.01); C08G 18/758 (2013.01); C09D 11/102 (2013.01); C09D 11/30 (2013.01); C09D 175/02 (2013.01)

(58) Field of Classification Search
None
See application file for complete search history.

(56) References Cited

U.S. PATENT DOCUMENTS

2019/0322793 A1 10/2019 Ji et al.

FOREIGN PATENT DOCUMENTS

EP 3599254 A1 1/2020

*Primary Examiner* — Cheng Yuan Huang
(74) *Attorney, Agent, or Firm* — The Webb Law Firm

(57) ABSTRACT

The present invention relates to an aqueous polyurethane-urea dispersion including polyurethane-urea and a preparation method and use thereof, especially in the field of coating compositions, binders or inks, and a product obtained by coating, bonding, sealing or printing with the aqueous polyurethane-urea dispersion. The polyurethane-urea of the aqueous polyurethane-urea dispersion including polyurethane-urea is obtained by the reaction of a system including the following components: a polyisocyanate, a polycarbonate polyol with a hydroxyl functionality of 1.9-2.1, a polyester polyol with a hydroxyl functionality of 1.9-2.1, an amino-containing compound, a hydroxyl-containing carboxylic acid and a neutralizer, where the weight ratio of the polycarbonate polyol to the polyester polyol is 6:1-20:1. The aqueous polyurethane-urea dispersion of the present invention has small particle size, narrow particle size distribution, good color rendering, hydrolysis resistance and color fastness to rubbing, and can be used as a binder for inkjet inks.

15 Claims, No Drawings

AQUEOUS POLYURETHANE-UREA DISPERSION

CROSS-REFERENCE TO RELATED APPLICATIONS

This application is the United States national phase of International Application No. PCT/EP2022/073752 filed Aug. 26, 2022, and claims priority to Chinese Patent Application No. 202111029317.4 filed Sep. 2, 2021, and European Patent Application No. 21204936.5 filed Oct. 27, 2021, the disclosures of which are hereby incorporated by reference in their entireties.

BACKGROUND

Technical Field

The present invention relates to an aqueous polyurethane-urea dispersion and a preparation method and use thereof, especially in the field of coating compositions, binders or inks, and a product obtained by coating, bonding, sealing or printing with the aqueous polyurethane-urea dispersion.

Description of Related Art

In order to fix the pigment of the ink to a substrate such as textile or leather, the ink used for the textile or leather printing usually contains an aqueous resin. At present, one of the main problems in formulations for inkjet inks is how to find an aqueous resin with good bonding performance.

First of all, aqueous resins usually play a decisive role in the color fastness to rubbing of inks. Aqueous resins usually have milky white appearance due to their large particle size and large polydispersity index, which has a negative impact on the good color rendering property of inks. Therefore, inks with higher color levels on the market usually contain less aqueous resin binders, resulting in lower fastness of the inks. On the contrary, in order to ensure that the inks have good color fastness to rubbing, it is necessary for the inks to contain a certain amount of aqueous resin, which causes the inks to fail to meet the requirements for color rendering. Moreover, the fine nozzle of the inkjet print head is usually in size of only a few microns, and the aqueous resins have a large particle size, which is prone to block the inkjet print head.

Secondly, inks, especially inkjet inks, have requirements for the viscosity of the aqueous resin binders. If the viscosity of the resin is high, it may increase the viscosity of the inkjet inks, making them difficult to be ejected from the inkjet print head.

Finally, the hydrolysis resistance of the aqueous resins themselves also has a significant impact on the color fastness of printed objects during long-term use. Objects printed with aqueous resins with poor hydrolysis resistance may lose their color after several washing operations.

Therefore, it is desired in the industry that there is an aqueous resin suitable for inkjet inks that has color rendering property, color fastness to rubbing and hydrolysis resistance.

SUMMARY

The object of the present invention is to provide an aqueous polyurethane-urea dispersion, and a preparation method and use thereof, especially in the field of coating compositions, binders or inks, and a product obtained by coating, bonding, sealing or printing with the aqueous polyurethane-urea dispersion.

In the aqueous polyurethane-urea dispersion comprising polyurethane-urea according to the present invention, the polyurethane-urea is obtained by the reaction of a system comprising the following components:

a. at least a polyisocyanate;
   b. at least a polycarbonate polyol with a hydroxyl functionality of 1.9-2.1;
   c. at least a polyester polyol with a hydroxyl functionality of 1.9-2.1, said polyester polyol being obtained by the reaction of a mixture comprising at least one of aromatic dibasic acids and aromatic acid anhydrides and a dihydric alcohol;
   d. at least an amino-containing compound, which is one or more of amino-containing carboxylic acids, amino-containing carboxylate salts, amino-containing sulfonic acids, and amino-containing sulfonate salts;
   e. at least a hydroxyl-containing carboxylic acid;
   f. at least a neutralizer; and
   g. optionally a compound reactive toward isocyanate groups, which is different from component b)-component e) and has a molecular weight of 32 g/mol-400 g/mol;
   wherein the weight ratio of the polycarbonate polyol to the polyester polyol is 6:1-20:1.

One aspect of the present invention is to provide a method for preparing the aqueous polyurethane-urea dispersion comprising polyurethane-urea according to the present invention, comprising the following steps:

i. reacting some or all of component a) at least a polyisocyanate, component b) at least a polycarbonate polyol with a hydroxyl functionality of 1.9-2.1, component c) at least a polyester polyol with a hydroxyl functionality of 1.9-2.1, component e) at least a hydroxyl-containing carboxylic acid and component g) optionally a compound reactive toward isocyanate groups, which is different from component b)-component e), to obtain a prepolymer;
   ii. reacting the prepolymer, component d) at least an amino-containing compound and component g) optionally a compound reactive toward isocyanate groups, which is different from component b)-component e), to obtain the polyurethane-urea;
   iii. adding component f) at least a neutralizer before or after step ii; and
   iv. introducing water before, during or after step ii, to obtain the aqueous polyurethane-urea dispersion.

Another aspect of the present invention is to provide a coating composition, a binder or an ink comprising the aqueous polyurethane-urea dispersion comprising polyurethane-urea according to the present invention.

Yet another aspect of the present invention is to provide use of the aqueous polyurethane-urea dispersion comprising polyurethane-urea according to the present invention for preparing coated products, bonded products or printed products.

Still another aspect of the present invention is to provide an object or an article comprising a substrate, which is prepared, coated, bonded, sealed, or printed with the aqueous polyurethane-urea dispersion comprising polyurethane-urea according to the present invention.

Yet another aspect of the present invention is to provide a printing method comprising the following steps: applying the aqueous polyurethane-urea dispersion comprising polyurethane-urea according to the present invention onto a surface of a substrate, and then curing.

Yet another aspect of the present invention is to provide a printed product comprising a substrate and a coating formed by applying the aqueous polyurethane-urea dispersion comprising polyurethane-urea according to the present invention onto the substrate.

The aqueous polyurethane-urea dispersion of the present invention has a low viscosity and is very suitable for inks, especially as a binder for inkjet inks. Moreover, the aqueous polyurethane-urea dispersion of the present invention has characteristics of small particle size (Z-average particle size of less than 75 nm), narrow particle size distribution (PDI of less than 0.3) and translucent appearance. The wet film formed therewith presents bright colors. After the wet film is dried, the dry film has high fastness to wet rubbing and long jungle test time (more than 2 weeks). The dry film formed by the aqueous polyurethane-urea dispersion of the present invention has good color rendering, color fastness to rubbing and hydrolysis resistance.

DETAILED DESCRIPTION

The present invention provides an aqueous polyurethane-urea dispersion comprising polyurethane-urea, which is obtained by the reaction of a system comprising the following components:

a. at least a polyisocyanate;

b. at least a polycarbonate polyol with a hydroxyl functionality of 1.9-2.1;

c. at least a polyester polyol with a hydroxyl functionality of 1.9-2.1, said polyester polyol being obtained by the reaction of a mixture comprising at least one of aromatic dibasic acids and aromatic acid anhydrides and a dihydric alcohol;

d. at least an amino-containing compound, which is one or more of amino-containing carboxylic acids, amino-containing carboxylate salts, amino-containing sulfonic acids, and amino-containing sulfonate salts;

e. at least a hydroxyl-containing carboxylic acid;

f. at least a neutralizer; and g. optionally a compound reactive toward isocyanate groups, which is different from component b)-component e) and has a molecular weight of 32 g/mol-400 g/mol, wherein the weight ratio of the polycarbonate polyol to the polyester polyol is 6:1-20:1.

The present invention further provides a method for preparing the aqueous polyurethane-urea dispersion, and use thereof, especially in the field of coating compositions, binders or inks, and a product obtained by coating, bonding, sealing or printing with the aqueous polyurethane-urea dispersion.

The term "curing" used herein refers to a process from liquid state of liquid substances to cured state.

The term "coating composition" used herein refers to a material that can be applied onto the surface of an object by a variety of application processes, so that a continuous solid coating layer with firm adhesion and certain strength is formed.

The term "binder" used herein refers to a chemical material that can be applied onto the surface of an object by a variety of application processes, so that a coating layer is formed on the surface of the object itself or on the surfaces of one object and another object, and the surface of the object itself or the surfaces of one object and another object are bonded. It is also used as a synonym for adhesive and/or sealant and/or bonder.

The term "polyurethane-urea" used herein refers to polyurethane and/or polyurethane polyurea and/or polyurea and/or polythiourethane.

The term "aqueous polyurethane-urea dispersion" as used herein refers to aqueous polyurethane dispersion and/or aqueous polyurethane polyurea dispersion and/or aqueous polyurea dispersion and/or aqueous polythiourethane dispersion.

The content of polyurethane-urea in the aqueous polyurethane-urea dispersion described herein is equivalent to that of the content of solid components in the aqueous polyurethane-urea dispersion.

The term "solid components" as used herein refers to solid constituents or effective components.

The term "compound reactive toward isocyanate groups" used herein refers to a component containing a group having reactivity toward isocyanate groups, that is, a component containing a group having zerewitinoff-active hydrogen. The definition of zerewitinoff-active hydrogen refers to Rompp's Chemical Dictionary (Rommp Chemie Lexikon), 10th edition, Georg Thieme Verlag Stuttgart, 1996. In general, the group having zerewitinoff-active hydrogen is understood in the art to mean hydroxyl group (OH), amino group ($NH_x$) and thiol group (SH).

Aqueous Polyurethane-Urea Dispersion

The amount of the organic solvent in the aqueous polyurethane-urea dispersion is preferably less than 1% by weight, relative to the total weight of the aqueous polyurethane-urea dispersion.

The aqueous polyurethane-urea dispersion has preferably at least one of the following characteristics:

viscosity of 10 mPa·s-1000 mPa·s, tested with a viscometer from Brookfield (Brookfield DV-II+Pro) according to the standard ISO 3219:1994;

solid content of 30%-40% by weight, tested with a halogen moisture analyzer from Mettler Toledo (Mettler Toledo Halogen Moisture Analyzer Excellence HS153);

Z-average particle size of 30 nm-75 nm, tested with Zetasizer Nano from Malvern (Malvern Zetasizer Nano ZS); and polydispersity index of 0-0.3, tested with Zetasizer Nano from Malvern (Malvern Zetasizer Nano ZS).

The content of the aqueous polyurethane-urea is most preferably 33%-40% by weight, relative to the total weight of the aqueous polyurethane-urea dispersion.

The color fastness to wet rubbing of the aqueous polyurethane-urea dispersion is preferably 4-5.

The result of jungle test of the aqueous polyurethane-urea dispersion is preferably greater than 2 weeks.

Component a) Polyisocyanate

The isocyanate functionality of the polyisocyanate is preferably not less than 2, and most preferably 2-4.

The polyisocyanate is preferably one or more of aliphatic polyisocyanates, alicyclic polyisocyanates, aromatic polyisocyanates, and their derivatives having iminooxadiazinedione, isocyanurate, uretdione, carbamate, allophanate, biuret, urea, oxadiazinetrione, oxazolidinone, acylurea and/or carbodiimide groups.

The aliphatic polyisocyanate is preferably one or more of hexamethylene diisocyanate, 1,5-pentamethylene diisocyanate, 2,2-dimethylpentamethylene diisocyanate, 2,2,4-trimethylhexamethylene diisocyanate, butene diisocyanate, 1,3-butadiene-1,4-diisocyanate, 2,4,4-trimethyl-1,6-hexamethylene diisocyanate, 1,6,11-undecane triisocyanate, 1,3,6-hexamethylene triisocyanate, 1,8-diisocyanato-4-isocyanatomethyl octane, bis(isocyanatoethyl) carbonate, bis (isocyanatoethyl) ether, methyl lysinate diisocyanate, lysine triisocyanate, bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl)disulfide, bis(isocyanatoethyl)disulfide, bis (isocyanatopropyl) disulfide, bis(isocyanatomethylthio) methane, bis(isocyanatoethylthio) methane, bis(isocyanatomethylthio) ethane, bis(isocyanatoethylthio) ethane, 1,5-diisocyanato-2-isocyanatomethyl-3-thiapentane, 1,2,3-tris(isocyanatomethylthio) propane, 1,2,3-tris(isocyanatoethylthio) propane, 3,5-dithia-1,2,6,7-heptane tetraisocyanate, 2,6-diisocyanatomethyl-3,5-dithia-1,7-heptane diisocyanate, 2,5-diisocyanatomethylthiophene, isocyanatoethylthio-2,6-dithia-1,8-octane diisocyanate, thiobis(3-isothiocyanatopropane), thiobis(2-isothiocyanatoethane) and dithiobis(2-isothiocyanatoethane); most preferably hexamethylene diisocyanate.

The alicyclic polyisocyanate is preferably one or more of 2,5-bis(isocyanatomethyl)-bicyclo[2.2.1]heptane, 2,6-bis (isocyanatomethyl)-bicyclo[2.2.1]heptane, bis(isocyanatomethyl)cyclohexane, isophorone diisocyanate, 4,4-dicyclohexylmethane diisocyanate, 2,5-diisocyanatotetrahydrothiophene, 2,5-diisocyanatomethyl tetrahydrothiophene, 3,4-diisocyanatomethyl tetrahydrothiophene, 2,5-diisocyanato-1,4-dithiane, 2,5-diisocyanatomethyl-1,4-dithiane, 4,5-diisocyanato-1,3-dithiolane, 4,5-bis (isocyanatomethyl)-1,3-dithiolane, 4,5-diisocyanatomethyl-2-methyl-1,3-dithiolane, norbornane diisocyanate (NBDI), xylylene diisocyanate (XDI), hydrogenated xylylene diisocyanate (H6XDI), 1,4-cyclohexyl diisocyanate (H6PPDI), m-tetramethyl xylylene diisocyanate (m-TMXDI) and cyclohexane diisothiocyanate, most preferably one or more of isophorone diisocyanate and 4,4'-dicyclohexylmethane diisocyanate.

The aromatic polyisocyanate is preferably one or more of 1,2-diisocyanatobenzene, 1,3-diisocyanatobenzene, 1,4-diisocyanatobenzene, 2,4-diisocyanatotoluene, ethylbenzene diisocyanate, isopropylbenzene diisocyanate, toluene diisocyanate, diethylbenzene diisocyanate, diisopropylbenzene diisocyanate, trimethylbenzene triisocyanate, benzene triisocyanate, biphenyl diisocyanate, toluidine diisocyanate, 4,4'-methylene bis(phenylisocyanate), 4,4'-methylene bis(2-methylphenyl isocyanate), bibenzyl-4,4'-diisocyanate, bis (isocyanatophenyl)ethylene, bis(isocyanatomethyl)benzene, bis(isocyanatoethyl)benzene, bis(isocyanatopropyl)benzene, α,α,α',α'-tetramethylxylylene diisocyanate, bis(isocyanatobutyl)benzene, bis(isocyanatomethyl) naphthalene, bis(isocyanatomethylphenyl) ether, bis(isocyanatoethyl) phthalate, 2,6-bis(isocyanatomethyl) furane, 2-isocyanatophenyl-4-isocyanatophenylsulfide, bis(4-isocyanatophenyl) sulfide, bis(4-isocyanatomethylphenyl) sulfide, bis(4-isocyanatophenyl)disulfide, bis(2-methyl-5-isocyanatophenyl) disulfide, bis(3-methyl-5-isocyanatophenyl)disulfide, bis(3-methyl-6-isocyanatophenyl)disulfide, bis(4-methyl-5-isocyanatophenyl)disulfide, bis(4-methoxy-3-isocyanatophenyl)disulfide, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-methylene bis(phenylisothiocyanate), 4,4'-methylene bis(2-methylphenylisothiocyanate), 4,4'-methylene bis (3-methylphenylisothiocyanate), 4,4'-diisothiocyanatobenzophenone, 4,4'-diisothiocyanato-3,3'-dimethylbenzophenone, bis(4-isothiocyanatophenyl) ether, 1-isothiocyanato-4-[(2-isothiocyanato) sulfonyl]benzene, thiobis(4-isothiocyanatobenzene), sulfonyl(4-isothiocyanatobenzene), hydrogenated toluene diisocyanate (H6TDI), diphenylmethane diisocyanate and dithiobis(4-isothiocyanatobenzene), most preferably one or more of 1,2-diisocyanatobenzene, 1,3-diisocyanatobenzene, 1,4-diisocyanatobenzene, diphenylmethane diisocyanate and 2,4-diisocyanatotoluene.

The other isocyanates may also have isocyanate groups and isothiocyanate groups, such as 1-isocyanato-6-isothiocyanatohexane, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanatophenyl-4-isothiocyanatophenylsulfide and 2-isocyanatoethyl-2-isothiocyanatoethyldisulfide.

The other isocyanates may also be halogen substitutions of the above-mentioned polyisocyanates, such as chlorine substitutions, bromine substitutions, alkyl substitutions, alkoxy substitutions, nitro substitutions or silane substitutions, such as isocyanatopropyl triethoxysilane or isocyanatopropyl trimethoxysilane.

The polyisocyanate is further preferably one or more of hexamethylene diisocyanate and isophorone diisocyanate, most preferably a combination of hexamethylene diisocyanate and isophorone diisocyanate. The molar ratio of the hexamethylene diisocyanate to isophorone diisocyanate is preferably 1:2-2:1.

The amount of component a) polyisocyanate is preferably of 10%-50% by weight, and most preferably 15%-30% by weight, relative to the total weight of the polyurethane-urea.
Component b) Polycarbonate Polyol with a Hydroxyl Functionality of 1.9-2.1

The polycarbonate polyol is preferably one or more of hexanediol polycarbonate, butanediol polycarbonate, neopentyl glycol polycarbonate, 3-methylpentanediol polycarbonate, and copolymers of the above polycarbonates.

The number average molecular weight of the polycarbonate polyol is preferably 800 g/mol-4000 g/mol.

The polycarbonate polyol is preferably in an amount of 60%-80% by weight, most preferably 65%-75% by weight, relative to the total weight of the polyurethane-urea.
Component c) Polyester Polyol with a Hydroxyl Functionality of 1.9-2.1

The polyester polyol is preferably one or more of linear polyester diols and slightly branched polyester polyols.

The polyester polyol is further preferably one or more of polyhexylene phthalate, polybutylene phthalate, polyneopentyl glycol phthalate, poly(diethylene glycol) phthalate, poly(3-methylpentanediol) phthalate, polyhexylene isophthalate, polybutylene isophthalate, polyneopentyl glycol isophthalate, poly(diethylene glycol) isophthalate, poly(3-methylpentanediol) isophthalate, polyhexylene terephthalate, polybutylene terephthalate, polyneopentyl glycol terephthalate, poly(diethylene glycol) terephthalate and poly(3-methylpentanediol) terephthalate; most preferably one or more of polyhexylene phthalate, polybutylene phthalate, polyneopentyl glycol phthalate, poly(diethylene glycol) phthalate, and poly(3-methylpentanediol) phthalate.

The polyester polyol is preferably prepared from the following components: aliphatic, alicyclic or aromatic di- or polycarboxylic acids, such as terephthalic acid, isophthalic acid, phthalic acid; anhydrides, such as phthalic anhydride, trimellitic anhydride or mixtures thereof; low molecular weight polyols, such as ethylene glycol, di-, tri-, tetra-ethylene glycol, 1,2-propylene glycol, di-, tri-, tetra-propylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol or mixtures thereof; and optionally polyols with higher functionality, such as trimethylolpropane, glycerol or pentaerythritol, alicyclic and/or aromatic di- and poly-hydroxy compounds.

The polyester polyol is further preferably obtained by the reaction of a mixture comprising at least one of aromatic dibasic acids and aromatic acid anhydrides and a dihydric alcohol. The aromatic dibasic acid is preferably one or more of terephthalic acid, isophthalic acid, phthalic acid. The aromatic acid anhydride is preferably phthalic anhydride. The dihydric alcohol is preferably one or more of 1,6-hexanediol, 1,4-butanediol, neopentyl alcohol, 3-methyl-pentanediol, and diethylene glycol.

The number average molecular weight of the polyester polyol is preferably 800 g/mol-4000 g/mol.

The polyester polyol is preferably in an amount of 2%-12% by weight, relative to the total weight of the polyurethane-urea.

Component d) Amino-Containing Compound

The amino-containing carboxylate salt is one or more of 6-aminocaproate, lysinate, and N-(2-aminoethyl)-β-alanine monosodium salt.

The amino-containing sulfonate salt is one or more of sodium 2-[(2-aminoethyl)amino]ethanesulfonate and sodium 3-(cyclohexylamine)-1-propanesulfonate.

The amino-containing compound is one or more of 6-aminocaproate, lysinate, N-(2-aminoethyl)-β-alanine monosodium salt, sodium 2-[(2-aminoethyl)amino]ethanesulfonate and sodium 3-(cyclohexylamine)-1-propanesulfonate.

The component d) amino-containing compound is preferably in an amount of 0.5%-2% by weight, most preferably 0.5%-1.0% by weight, relative to the total weight of the polyurethane-urea.

Component e) Hydroxyl-Containing Carboxylic Acid

The hydroxyl-containing carboxylic acid is preferably one or more of 2,2-dimethylolpropionic acid and 2,2-dimethylolbutanoic acid.

The hydroxyl-containing carboxylic acid is preferably in an amount of 1%-5% by weight, most preferably 2%-3% by weight, relative to the total weight of the polyurethane-urea.

Component f) Neutralizer

The neutralizer is preferably one or more of organic tertiary amines and inorganic bases; most preferably one or more of triethylamine, triethanolamine, dimethylethanolamine, methyldiethanolamine, ethyl diisopropylamine, ammonia, sodium hydroxide and potassium hydroxide.

The neutralizer is preferably in an amount of 65-105 mol %, relative to the total moles of the carboxyl groups of the component e) hydroxyl-containing carboxylic acid.

The hydroxyl-containing carboxylic acid and the neutralizer may be directly present in the system in the form of a salt of the hydroxyl-containing carboxylic acid.

Component g) Compound Reactive Toward Isocyanate Groups, which is Different from Component b)-Component e)

Component g) optionally a compound reactive toward isocyanate groups, which is different from component b)-component e), may be one or more of polyols with a hydroxyl functionality of 2-3 and amino compounds with an amino functionality of 2-3.

The polyol with a hydroxyl functionality of 2-3 is preferably one or more of diethylene glycol, propanediol, butanediol, hexanediol, pentanediol, trimethylolpropane and glycerin.

The amino compound with an amino functionality of 2-3 is preferably one or more of ethylenediamine, propylenediamine, butanediamine, hexamethylenediamine, N-(2-hydroxyethyl)-ethylenediamine, isophorone diamine, hydrazine hydrate and diethylene triamine.

The component g) is preferably in an amount of 0.5%-2.5% by weight, most preferably 0.5%-1% by weight, relative to the total weight of the polyurethane-urea.

System

The system may further comprise one or more of external emulsifiers, solvents, reactive diluents and stabilizers, which is/are added in an amount commonly used by those skilled in the art.

Method for Preparing the Aqueous Polyurethane-Urea Dispersion Comprising Polyurethane-Urea Preferably, step iii is carried out before step iv, when step iv is carried out before step ii.

The step sequence of the method is preferably step i, step iii, step ii and step iv successively.

The preparation method preferably further comprises step v, introducing an organic solvent during or after step i.

The organic solvent is preferably a solvent that is miscible with water but inert to isocyanate groups, and further preferably one or more of acetone, methyl ethyl ketone, propylene glycol dimethyl ether, other ethers without hydroxyl functional groups and esters without hydroxyl functional groups; most preferably one or more of acetone and butanone.

The organic solvent preferably comprises no pyrrolidone compounds.

The preparation method preferably further comprises step vi, removing the organic solvent introduced in step v from the aqueous polyurethane-urea dispersion.

The organic solvent may be removed by distillation. The solvent may be removed during or after step iv.

The amount of the organic solvent remained in the aqueous polyurethane-urea dispersion is preferably less than 1.0% by weight, relative to the total weight of the aqueous polyurethane-urea dispersion.

In order to accelerate the reaction of step i, a catalyst commonly used for preparing prepolymers may be used, such as triethylamine, 1,4-diazabicyclo[2,2,2]-octane, tin dioctanoate or dibutyl tin dilaurate, most preferably dibutyl tin dilaurate.

The catalyst may be placed into the reactor simultaneously with the components of step i, or may be added later.

The conversion degree of the components of step i can be obtained by testing the NCO content in the components. To this end, spectroscopic measurement, such as infrared or near-infrared spectroscopic measurement, as well as refractive index determination or chemical analysis, such as titration, may be performed on the extracted samples at the same time.

The prepolymer may be in solid state or liquid state at normal temperature.

The neutralization degree of the prepolymer may be 50 mol %-125 mol %, preferably 65 mol %-105 mol %.

Coating Composition, Binder or Ink

The coating composition, binder or ink preferably further comprises an additive. The additive is preferably one or more of adhesion promoters, lubricants, emulsifiers, light stabilizers, antioxidants, fillers, anti-settling agents, defoamers, wetting agents, flow regulators, antistatic agents, film forming aids, reactive diluents, plasticizers, catalysts, thickeners, pigments, dyes, tackifiers and matting agents.

In principle, selection and dosage of the additive are known to those of ordinary skill in the art and can be easily determined.

The aqueous polyurethane-urea dispersion of the present invention may also be mixed and used together with other water- or solvent-containing oligomers or polymers, such as water- or solvent-containing polyesters, polyurethanes, polyurethane-polyacrylates, polyacrylates, polyethers, poly-ester-polyacrylates, alkyd resins, addition polymers, poly-amide/-imides or polyepoxides. Simple preliminary tests should be used in each case to test the compatibility of such mixtures.

The aqueous polyurethane-urea dispersion of the present invention may also be mixed and used together with other compounds containing functional groups, such as carboxyl groups, hydroxyl groups and/or blocked isocyanate groups.

The coating composition, binder or ink of the present invention is obtained by processing according to methods known to those skilled in the art.

Coating Method, Bonded Product or Printed Product

The substrate is preferably one or more of wood, metal, glass, fiber, textile, artificial leather, real leather, paper, plastic, rubber, foam, ceramic and various polymer coating, and most preferably one or more of textile, plastic, ceramic, metal, real leather, artificial leather and various polymer coating.

The coating may be carried out by applying the coating composition, binder or ink onto an entire surface of the substrate or only onto one or more parts of the surface of the substrate.

The coating may be brush coating, dip coating, spray coating, roller coating, knife coating, flow coating, casting, or printing.

Printing Method and Printed Product

The application may be carried out by applying the coating composition, binder or ink onto an entire surface of the substrate or only onto one or more parts of the surface of the substrate.

The application may be carried out by means of knife coating or printing. The printing is preferably inkjet printing.

EXAMPLES

Unless defined otherwise, all technical and scientific terms used herein have the same meaning as commonly understood by those skilled in the art. When the definition of a term in this specification conflicts with the meanings commonly understood by those skilled in the art, the definition described herein shall prevail.

Unless indicated otherwise, all numbers expressing quantities of ingredients, reaction conditions and the like used in the specification and claims are understood as being modified by the wording "about". Accordingly, the numerical parameters set forth herein are approximations that can vary depending upon the desired properties to be obtained, unless indicated to the contrary.

The wording "and/or" used herein refers to one or all of the cited elements.

The wording "include" and "comprise" used herein cover cases in which only the mentioned elements, and cases in which other unmentioned elements are present in addition to the mentioned elements.

Unless otherwise indicated, the wording "a", "an", and "the" used herein are intended to include "at least one" or "one or more". For example, the wording "a component" refers to one or more components, therefore more than one component may be considered and adopted or used in the implementation of the embodiments.

All percentages in the present invention are weight percentage, unless otherwise stated.

The analysis and measurement in the present invention are performed at $23\pm2^\circ$ C., unless otherwise stated.

The number-average molecular weight of the polymer polyol is measured at 40° C. using gel permeation chromatography with tetrahydrofuran as the mobile phase against polystyrene standard sample.

Raw Materials and Agents

Desmophen C2202: polycarbonate diol with a hydroxyl functionality of 2.0, number average molecular weight of 2000 g/mol, available from Covestro, Germany.

P200H/DS: polyhexylene phthalate diol with a hydroxyl functionality of 2.0, number average molecular weight of 2000 g/mol, available from Covestro, Germany.

Desmophen C1200: polycarbonate polycaprolactone diol with a ratio of polycarbonate:polycaprolactone=1.2:1 (mass ratio), a hydroxyl functionality of 2.0, and number average molecular weight of 2000 g/mol, available from Covestro, Germany.

Desmodur® H: 1,6-hexamethylene diisocyanate, available from Covestro, Germany.

Desmodur® I: isophorone diisocyanate, available from Covestro, Germany.

Desmodur® W: dicyclohexylmethane diisocyanate, available from Covestro, Germany.

AAS: aqueous solution of sodium N-(2-aminoethyl)aminoethanesulfonate $NH_2$—$CH_2CH_2$—$NH$—$CH_2CH_2$—$SO_3Na$, with a concentration of 49%, available from Covestro, Germany.

Dimethylolpropionic acid: a hydroxyl-containing carboxylic acid, available from Sigma Aldrich.

SP-9111: bright red color paste, red viscous liquid, available from Shanghai Xude Fine Chemicals Co., Ltd.

BYK 349: silicone surfactant, available from BYK.

1,2-Propylene glycol: co-solvent, available from Shanghai Gaoxin Chemical Glass Instrument Co., Ltd.

Tego 825: defoamer, available from Evonik Specialty Chemicals (Shanghai) Co., Ltd.

Borchigel L 75N: rheology additive, available from Borchers USA.

Borchigel ALA: rheology additive, available from Borchers USA.

Imprafix IO 3025: isocyanate crosslinker, available from Covestro.

Test Methods

Test for Z-Average Particle Size and Polydispersity Index PDI of Aqueous Polyurethane-Urea Dispersions One drop of aqueous polyurethane-urea dispersion was added to 50 ml of ultrapure water, and gently stirred for dilution. After dilution, It was tested with Zetasizer Nano from Malvern (Malvern Zetasizer Nano ZS). Test temperature was $23.0\pm0.1^\circ$ C. Setting for test material: polystyrene latex (refractive index of 1.590, absorption value of 0.010); setting for dispersant: water (temperature of 23.0° C., viscosity of 0.9308 cps, refractive index of 1.330); and equilibrium time of 60 seconds. Type of sample cell: disposable sample cell DTS0012. Positioning method: automatic attenuation, automatic optimization of positioning. Analysis mode: general purpose (normal resolution). Test angle: 173° backscatter (NIBS default). Each sample was tested for 3 rounds with 10 times per round, the time for each test being 10 seconds. Z-average particle size and polydispersity index were average of all tests, respectively. Z-average particle size was defined according to the standard ISO 13321 as the average particle size measured according to the principle of dynamic light scattering. The polydispersity index represents the distribution of particle size. The closer to 0 is PDI, the narrower is the particle size distribution.

The Z-average particle size of less than 75 nm is regarded as qualified. The polydispersity index PDI (narrow particle size distribution) of less than 0.3 is regarded as qualified.

Viscosity of Aqueous Polyurethane-Urea Dispersions

Viscosity was tested with Brookfield viscometer DV-II+ Pro according to the standard ISO 3219:1994. 150 g of the aqueous polyurethane-urea dispersion was weighed into a glass bottle. The viscosity was measured at room temperature (20-25° C.) with a spindle having the number of S62 at a rotational speed of 30 rpm.

An aqueous polyurethane-urea dispersion with a viscosity of less than 1000 mPa·s is regarded as qualified.

Content of Solid Components of the Aqueous Polyurethane-Urea Dispersion (Solid Content)

It was tested with a halogen moisture analyzer from Mettler Toledo (Mettler Toledo Halogen Moisture Analyzer Excellence HS153). A piece of glass fiber filter paper was placed on a standard aluminum weighing pan. 1 gram of the aqueous polyurethane-urea dispersion was dropped on the glass fiber filter paper. It was dried with a standard drying procedure at drying temperature of 120° C. with stop standard of level 5 (1 mg/140 seconds). That is, the sample was heated at 120° C. and continuously weighed. If the weight loss of the sample was less than 1 mg within 140 seconds, the test was stopped and the remaining weight percentage was recorded as the solid content.

Evaluation Method for the Appearance of Aqueous Polyurethane-Urea Dispersions 50 g of the aqueous polyurethane-urea dispersion was charged into a transparent glass bottle with a diameter of 3 cm, and it was visually observed in front of a paper card having black/white grid pattern. If the grid pattern behind the glass could be clearly seen through the glass bottle and the color of the grid pattern had no obvious change, it was transparent. If the grid pattern behind the glass could be clearly seen through the glass bottle, while the color of the grid pattern changed, it was translucent. If the grid pattern behind the glass bottle could not be clearly seen, it was opaque.

If the aqueous polyurethane-urea dispersion was translucent or transparent in appearance, it was regarded as qualified. If it was opaque in appearance, it was regarded as unqualified.

Jungle Test of Dry Films of Aqueous Polyurethane-Urea Dispersions

Step 1: Film Preparation

99% by weight of the aqueous polyurethane-urea dispersion or the comparative aqueous polyurethane-urea dispersion was added to the batching tank. Then, 1% by weight of Borchigel ALA was added. It was fully stirred, and the viscosity was adjusted to about 5000 cps. Glossy release paper with a size of A4 paper was placed on the glass table and fixed on the table smoothly with adhesive tape. A film applicator of 500 μm was placed on the upper end of the release paper. The film applicator was held on both ends with hand and pulled down to the bottom at a constant speed without stopping. After completion, the film applicator was cleaned. The obtained sample was removed, placed on a high temperature-resistant plate, and dried in an oven at 50° C. for 30 minutes. After the sample was dried, it was placed in an oven at 150° C. for 3 minutes. The sample was taken out, and the front side of the film was coated with talc powder in a fume hood. The film was removed from the release paper, and also coated with talc powder on the back side, and left at room temperature for 24 hours. The film preparation was completed.

The film was cut with a standard cutter into dumbbell-shaped test strips in accordance with S2 in the standard DIN 53504. On the tensile machine from GOTECH, initial 100% modulus, initial tensile elongation at break and initial tensile strength of the samples were tested according to the test standard DIN 53504.

Step 2: Jungle Aging Test

The prepared film was put into a chamber with constant temperature and humidity at a temperature of 70° C. and a relative humidity of 95%. At least 3 parallel samples were prepared for each example or comparative example. The film was taken out after 7 days, and cut with a standard cutter into dumbbell-shaped test strips in accordance with S2 in the standard DIN 53504, and tested after being left at 23° C. and 55% relative humidity for 24 hours. On the tensile machine from GOTECH, 100% modulus, tensile elongation at break and tensile strength after aging were tested according to the test standard DIN 53504.

If 100% modulus, tensile elongation at break, and tensile strength after aging were reduced by less than or equal to 50% from initial 100% modulus, tensile elongation at break, and tensile strength, the sample was regarded as passing the test. The sample was put into the chamber with constant temperature and humidity at a temperature of 70° C. and a relative humidity of 95% again. After 7 days, the sample was taken out again for the test for 100% modulus, tensile elongation at break and tensile strength after aging. If the morphology of the sample deteriorated severely (e.g. being sticky, deformed, or having holes, etc.), or 100% modulus, tensile elongation at break, and tensile strength after aging were reduced by more than 50% from initial 100% modulus, tensile elongation at break, and tensile strength, the sample was regarded as failing the test. The aging test was terminated, and the time (week) during which the sample film was stored in the chamber with constant temperature and humidity was recorded as the result of jungle aging test of the sample. If 100% modulus, tensile elongation at break, and tensile strength after aging were reduced by less than or equal to 50% from initial 100% modulus, tensile elongation at break, and tensile strength, the sample was regarded as passing the test. The sample was put into the chamber with constant temperature and humidity at a temperature of 70° C. and a relative humidity of 95% again. The sample was taken out again for analysis after 7 days, and so on.

Longer storage time indicates better hydrolysis resistance of the sample. The time of jungle aging test of greater than 2 weeks was regarded as qualified.

Equipment Used for the Test

Tension machine from GOTECH: Model of GOTECH/AI-3000, available from GOTECH Testing Machines Inc.

Film applicator: Model of ISO-500 μm, available from Shanghai Modern Environmental Engineering Technology Co., Ltd.

Chamber with constant temperature and humidity: GWS EW0440, available from Guangzhou Wusuo Environmental Instrument Co., Ltd.

Film thickness gauge: Model of SM-114, available from TECLOCK Co., Ltd.

Test for Color Fastness to Wet Rubbing

Step 1: The following components were mixed, so that printing paste was prepared: 82% by weight of the aqueous polyurethane-urea dispersion or comparative aqueous polyurethane-urea dispersion, 10% by weight of SP9111, 3% by weight of 1,2-propylene glycol, 0.5% by weight of Tego 825, 0.5% by weight of BYK349, 1% by weight of Borchigel L75N and 3% by weight of Imprafix IO 3025.

Step 2: Preparation and Test of Printed Samples

1. The above prepared printing paste was printed using a 120 mesh nylon screen printing plate, wherein the substrate was white leather prepared with aqueous polyurethane, and it was applied with a spatula for 6 times.

2. The printed sample was placed in the condition of 25° C. and 50% relative humidity for 72 hours and allowed to dry naturally.

3. The color fastness to wet rubbing was tested with a crockmeter (GT-7034-A, GOTECH Testing Machines Inc.) according to the standard AATCC-8-2016. The staining was assessed according to the standard CTA, wherein a gray scale was used for scoring with a total of 1-5 levels. The higher the score is, the better the color fastness to wet rubbing is. The color fastness to wet rubbing with a score of not less than 4 is regarded as qualified.

Equipment Used for the Test

Disperser: Model of SFJ400, available from Shanghai Modern Environmental Engineering Technology Co., Ltd.

Electronic balance: Model of BSA4202S Max 4200 g, d=0.01 g, available from Sartorius Group.

Preparation of Aqueous Polyurethane-Urea Dispersions

Aqueous Polyurethane-Urea Dispersion 1

225.14 g of Desmophen C2202 and 34.11 g of P200H/DS were dehydrated at 100° C. and 100 mbar for 1 hour. After the mixture was cooled to 70° C., 9.03 g of dimethylolpropionic acid was added and stirred until uniformly dispersed. 5.99 g of Desmodur®H and 61.01 g of Desmodur®I were added at 65° C. and reacted at 100° C. until reaching isocyanate content of 2.84%. It was then dissolved in 596 g of acetone and cooled to 40° C. to obtain a reaction solution. Then, 6.68 g of triethylamine was added and stirred vigorously for 10 minutes. 5.26 g of sodium N-(2-aminoethyl)aminoethanesulfonate solution and a solution of 2.9 g of ethylenediamine in 33.32 g of water were added, and stirred vigorously for 10 minutes. Then, 597 g of water was added to disperse the mixture. Subsequently, acetone was separated by distillation to obtain the aqueous polyurethane-urea dispersion 1 with solid content of 35.8% by weight.

Aqueous Polyurethane-Urea Dispersion 2

246.37 g of Desmophen C2202 and 12.88 g of P200H/DS were dehydrated at 100° C. and 100 mbar for 1 hour. After the mixture was cooled to 70° C., 9.03 g of dimethylolpropionic acid was added and stirred until uniformly dispersed. 5.99 g of Desmodur®H and 61.01 g of Desmodur®I were added at 65° C. and reacted at 100° C. until reaching isocyanate content of 2.84%. It was then dissolved in 596 g of acetone and cooled to 40° C. to obtain a reaction solution. Then, 6.68 g of triethylamine was added and stirred vigorously for 10 minutes. 5.26 g of sodium N-(2-aminoethyl)aminoethanesulfonate solution and a solution of 2.9 g of ethylenediamine in 33.32 g of water were added, and stirred vigorously for 10 minutes. Then, 596 g of water was added to disperse the mixture. Subsequently, acetone was separated by distillation to obtain the aqueous polyurethane-urea dispersion 2 with solid content of 36.5% by weight.

Comparative Aqueous Polyurethane-Urea Dispersion 1

259.26 g of Desmophen C2202 was dehydrated at 100° C. and 100 mbar for 1 hour. After it was cooled to 70° C. 9.03 g of dimethylolpropionic acid was added and stirred until uniformly dispersed. 5.99 g of Desmodur®H and 61.01 g of Desmodur®I were added at 65° C. and reacted at 100° C. until reaching isocyanate content of 2.84%. It was then dissolved in 596 g of acetone and cooled to 40° C. to obtain a reaction solution. Then, 6.68 g of triethylamine was added and stirred vigorously for 10 minutes. 5.26 g of sodium N-(2-aminoethyl)aminoethanesulfonate solution and a solution of 7.06 g of n-butylamine in 60.67 g of water were added, and stirred vigorously for 10 minutes. Then, 577 g of water was added to disperse the mixture. Subsequently, acetone was separated by distillation to obtain the comparative aqueous polyurethane-urea dispersion 1 with solid content of 36.4% by weight.

Comparative Aqueous Polyurethane-Urea Dispersion 2

259.26 g of Desmophen C2202 was dehydrated at 100° C. and 100 mbar for 1 hour. After it was cooled to 70° C. 9.03 g of dimethylolpropionic acid was added and stirred until uniformly dispersed. 68.93 g of Desmodur®I was added at 65° C. and reacted at 100° C. until reaching isocyanate content of 2.83%. It was then dissolved in 599 g of acetone and cooled to 40° C. to obtain a reaction solution. Then, 6.68 g of triethylamine was added and stirred vigorously for 10 minutes. 5.26 g of sodium N-(2-aminoethyl)aminoethanesulfonate solution and a solution of 2.9 g of ethylenediamine in 33.32 g of water were added, and stirred vigorously for 10 minutes. Then 600 g of water was added to disperse the mixture. Subsequently, acetone was separated by distillation to obtain the comparative aqueous polyurethane-urea dispersion 2 with solid content of 36.8% by weight.

Comparative Aqueous Polyurethane-Urea Dispersion 3

216.05 g of Desmophen C2202 and 43.21 g of P200H/DS wre dehydrated at 100° C. and 100 mbar for 1 hour. After the mixture was cooled to 70° C. 9.03 g of dimethylolpropionic acid was added and stirred until uniformly dispersed. 5.99 g of Desmodur®H and 61.01 g of Desmodur®I were added at 65° C. and reacted at 100° C. until reaching isocyanate content of 2.84%. It was then dissolved in 596 g of acetone and cooled to 40° C. to obtain a reaction solution. Then, 6.68 g of triethylamine was added and stirred vigorously for 10 minutes. 5.26 g of sodium N-(2-aminoethyl)aminoethanesulfonate solution and a solution of 2.9 g of ethylenediamine in 33.32 g of water were added, and stirred vigorously for 10 minutes. Then, 596 g of water was added to disperse the mixture. Subsequently, acetone was separated by distillation to obtain the comparative aqueous polyurethane-urea dispersion 3 with solid content of 35.5% by weight.

Comparative Aqueous Polyurethane-Urea Dispersion 4

420 g of Desmophen C1200 was dehydrated at 100° C. and 100 mbar for 1 hour. After it was cooled to 70° C., 20.54 g of dimethylolpropionic acid was added and stirred until uniformly dispersed. 25.74 g of Desmodur®W and 108.22 g of Desmodur®I were added at 65° C. and reacted at 100° C. until reaching isocyanate content of 3.24%. It was then dissolved in 1021 g of acetone and cooled to 40° C. to obtain a reaction solution. Then, 15.21 g of triethylamine wsa added and stirred vigorously for 10 minutes. 13.81 g of sodium N-(2-aminoethyl)aminoethanesulfonate solution and a solution of 9.6 g of ethylenediamine in 103.83 g of water were added, and stirred vigorously for 10 minutes. Then, 968 g of water was added to disperse the mixture. Subsequently, acetone was separated by distillation to obtain the comparative aqueous polyurethane-urea dispersion 4 with solid content of 30.7% by weight.

Comparative Aqueous Polyurethane-Urea Dispersion 5

225.14 g of Desmophen C2202 and 34.11 g of P200H/DS were dehydrated at 100° C. and 100 mbar for 1 hour. After the mixture was cooled to 70° C., 9.03 g of dimethylolpropionic acid was added and stirred until uniformly dispersed. 5.99 g of Desmodur®H and 61.01 g of Desmodur®I were added at 65° C. and reacted at 100° C. until reaching isocyanate content of 2.84%. It was then dissolved in 596 g of acetone and cooled to 40° C. to obtain a reaction solution. Then, 6.68 g of triethylamine was added and stirred vigorously for 10 minutes. A solution of 3.72 g of ethylenediamine in 24.43 g of water was added, and stirred vigorously for 10 minutes. Then, 605 g of water was added to disperse the mixture. Subsequently, acetone was separated by distillation to obtain the comparative aqueous polyurethane-urea dispersion 5 with solid content of 35.2% by weight.

Comparative Aqueous Polyurethane-Urea Dispersion 6

225.14 g of Desmophen C2202 and 34.11 g of P200H/DS were dehydrated at 100° C. and 100 mbar for 1 hour. 4.96 g of Desmodur®H and 50.51 g of Desmodur®I were added at 65° C. and reacted at 100° C. until reaching isocyanate content of 3.40%. It was then dissolved in 559 g of acetone and cooled to 40° C. to obtain a reaction solution. Then, 17.34 g of sodium N-(2-aminoethyl)aminoethanesulfonate solution and a solution of 2.4 g of ethylenediamine in 62.76 g of water were added, and stirred vigorously for 10 minutes. Then, 533 g of water was added to disperse the mixture. Subsequently, acetone was separated by distillation to obtain the comparative aqueous polyurethane-urea dispersion 6 with solid content of 34.9% by weight.

Table 1 shows the evaluation results of viscosity, Z-average particle size, polydispersity index (PDI), color fastness to wet rubbing, jungle test and appearance of the aqueous polyurethane-urea dispersions of the examples of the present invention and the comparative examples.

resistance. The aqueous polyurethane-urea dispersions of the present patent application had low viscosity and were particularly suitable as the resin binder component for ink formulations for inkjet printing.

The systems of the aqueous polyurethane-urea dispersions of comparative examples 1 and 2 comprised no aromatic polyester polyol, and the aqueous polyurethane-urea dispersions could not have both good jungle test time and good color fastness to wet rubbing. In addition, the appearance of the aqueous polyurethane-urea dispersion of comparative example 1 was opaque. That is, the film formed by it had poor color rendering, and the color was not bright.

The weight ratio of the polycarbonate polyol to the aromatic polyester polyol in the system of the aqueous polyurethane-urea dispersion of comparative example 3 was less than 6:1, and the jungle test time of the aqueous polyurethane-urea dispersion was short.

The weight ratio of the polycarbonate polyol to the aliphatic polyester polyol in the system of the aqueous polyurethane-urea dispersion of comparative example 4 was greater than 20:1, and the aqueous polyurethane-urea dispersion had high viscosity and short jungle test time.

The system of the aqueous polyurethane-urea dispersion of comparative example 5 comprised no amino group-

TABLE 1

Evaluation of aqueous polyurethane-urea dispersions

| | Aqueous polyurethane-urea dispersions | Viscosity/ mPa · s | Z-average particle size/nm | Polydispersity index | Color fastness to wet rubbing | Jungle test | Appearance |
|---|---|---|---|---|---|---|---|
| Ex. 1 | Aqueous polyurethane-urea dispersion 1 | 28.6 | 54.92 | 0.088 | 4 | >2 weeks | translucent |
| Ex. 2 | Aqueous polyurethane-urea dispersion 2 | 32.4 | 58.44 | 0.074 | 4 | >2 weeks | translucent |
| Comp. Ex. 1 | Comparative aqueous polyurethane-urea dispersion 1 | 39.4 | 72.58 | 0.031 | * | <1 week | opaque |
| Comp. Ex. 2 | Comparative aqueous polyurethane-urea dispersion 2 | 63.4 | 61.76 | 0.095 | 3 | >2 weeks | translucent |
| Comp. Ex. 3 | Comparative aqueous polyurethane-urea dispersion 3 | 44 | 59.53 | 0.097 | * | <1 week | translucent |
| Comp. Ex. 4 | Comparative aqueous polyurethane-urea dispersion 4 | 1840 | 70.82 | 0.207 | * | <1 week | translucent |
| Comp. Ex. 5 | Comparative aqueous polyurethane-urea dispersion 5 | 252 | 84.16 | 0.154 | 3 | ** | opaque |
| Comp. Ex. 6 | Comparative aqueous polyurethane-urea dispersion 6 | 29 | 286.1 | 0.373 | *** | *** | opaque |

Remarks:
* Color fastness to wet rubbing was not tested due to the unqualified results of the jungle test;
** Jungle test was not carried out due to the unqualified test result of the color fastness to wet rubbing;
*** Color fastness to wet rubbing test and jungle test were not carried out due to the unqualified Z-average particle size of the aqueous polyurethane-urea dispersion.

The aqueous polyurethane-urea dispersions of the examples of the present patent application had the characteristics of small particle size, narrow particle size distribution and translucency. Therefore, the wet films formed by the aqueous polyurethane-urea dispersions of the present invention had bright colors. The paint films of the aqueous polyurethane-urea dispersions of the present patent application had high color fastness to wet rubbing and long test time in the jungle test of dry films. Thus, the dry films formed thereby had good color fastness to rubbing and hydrolysis containing compound, and the aqueous polyurethane-urea dispersion had large Z-average particle size, poor color fastness to wet rubbing and opaque appearance.

The system of the aqueous polyurethane-urea dispersion of comparative example 6 comprised no hydroxyl-containing carboxylic acid, and the aqueous polyurethane-urea dispersion had large Z-average particle size, large polydispersity index, and opaque appearance.

Those skilled in the art will readily understand that the present invention is not limited to the foregoing details, and can be implemented in other specific forms without departing from the spirit or main characteristics of the present invention. Therefore, the examples should be regarded as illustrative rather than restrictive from any point of view, so that the scope of the present invention is illustrated by the claims rather than the foregoing description. Therefore, any change should be regarded as belonging to the present invention, as long as it falls into the meaning and scope of equivalents of the claims.

The invention claimed is:

1. An aqueous polyurethane-urea dispersion comprising polyurethane-urea, wherein the polyurethane-urea is obtained by the reaction of a system comprising the following components:
    a. at least a polyisocyanate;
    b. at least a polycarbonate polyol with a hydroxyl functionality of 1.9-2.1;
    c. at least a polyester polyol with a hydroxyl functionality of 1.9-2.1, said polyester polyol being obtained by the reaction of a mixture comprising at least one of aromatic dibasic acids and aromatic acid anhydrides and a dihydric alcohol;
    d. at least an amino-containing compound, which is one or more of amino-containing carboxylic acids, amino-containing carboxylate salts, amino-containing sulfonic acids, and amino-containing sulfonate salts;
    e. at least a hydroxyl-containing carboxylic acid;
    f. at least a neutralizer; and
    g. optionally a compound reactive toward isocyanate groups, which is different from component b)-component e) and has a molecular weight of 32 g/mol-400 g/mol; and
    wherein the weight ratio of the polycarbonate polyol to the polyester polyol is 6:1-20:1.

2. The aqueous polyurethane-urea dispersion according to claim 1, wherein an amount of organic solvent in the aqueous polyurethane-urea dispersion is less than 1% by weight, relative to the total weight of the aqueous polyurethane-urea dispersion.

3. The aqueous polyurethane-urea dispersion according to claim 1, wherein the aqueous polyurethane-urea dispersion has at least one of the following characteristics:
    viscosity of 10 mPa·s-1000 mPa·s, tested with a viscometer from Brookfield according to the standard ISO 3219:1994;
    solid content of 30%-40% by weight, tested with a halogen moisture analyzer from Mettler Toledo;
    Z-average particle size of 30 nm-75 nm, tested with Zetasizer Nano from Malvern; and
    polydispersity index of 0-0.3, tested with Zetasizer Nano from Malvern.

4. The aqueous polyurethane-urea dispersion according to claim 1, wherein the polyisocyanate is one or more of hexamethylene diisocyanate and isophorone diisocyanate.

5. The aqueous polyurethane-urea dispersion according to claim 1, wherein the polycarbonate polyol is one or more of hexanediol polycarbonate, butanediol polycarbonate, neopentyl glycol polycarbonate, 3-methylpentanediol polycarbonate, and copolymers of the above polycarbonates.

6. The aqueous polyurethane-urea dispersion according to claim 1, wherein the polyester polyol is one or more of polyhexylene phthalate, polybutylene phthalate, polyneopentyl glycol phthalate, poly(diethylene glycol) phthalate, poly(3-methylpentanediol) phthalate, polyhexylene isophthalate, polybutylene isophthalate, polyneopentyl glycol isophthalate, poly(diethylene glycol) isophthalate, poly(3-methylpentanediol) isophthalate, polyhexylene terephthalate, polybutylene terephthalate, polyneopentyl glycol terephthalate, poly(diethylene glycol) terephthalate and poly(3-methylpentanediol) terephthalate; most preferably one or more of polyhexylene phthalate, polybutylene phthalate, polyneopentyl glycol phthalate, poly(diethylene glycol) phthalate, and poly(3-methylpentanediol) phthalate.

7. The aqueous polyurethane-urea dispersion according to claim 1, wherein the amino-containing compound is one or more of 6-aminocaproate, lysinate, N-(2-aminoethyl)-β-alanine monosodium salt, sodium 2-[(2-aminoethyl)amino]ethanesulfonate and sodium 3-(cyclohexylamine)-1-propanesulfonate.

8. The aqueous polyurethane-urea dispersion according to claim 1, wherein the hydroxyl-containing carboxylic acid is one or more of 2,2-dimethylolpropionic acid and 2,2-dimethylolbutanoic acid.

9. A method for preparing the aqueous polyurethane-urea dispersion comprising polyurethane-urea according to claim 1, comprising the following steps:
    i. reacting some or all of component a) at least the polyisocyanate, component b) at least the polycarbonate polyol with a hydroxyl functionality of 1.9-2.1, component c) at least the polyester polyol with a hydroxyl functionality of 1.9-2.1, component e) at least the hydroxyl-containing carboxylic acid and component g) optionally the compound toward isocyanate groups, which is different from component b)-component e), to obtain a prepolymer;
    ii. reacting the prepolymer, component d) at least the amino-containing compound and component g) optionally the compound reactive toward isocyanate groups, which is different from component b)-component e), to obtain the polyurethane-urea;
    iii. adding component f) at least the neutralizer before or after step ii; and
    iv. introducing water before, during or after step ii to obtain the aqueous polyurethane-urea dispersion.

10. The method according to claim 9, further comprising step v, introducing an organic solvent miscible with water but inert to isocyanate groups during or after step i, and removing the organic solvent from the aqueous polyurethane-urea dispersion.

11. A coating composition, a binder or an ink, comprising the aqueous polyurethane-urea dispersion comprising polyurethane-urea according to claim 1.

12. A method for preparing coated products, bonded products or printed products comprising providing the aqueous polyurethane-urea dispersion comprising polyurethane-urea according to claim 1.

13. An object or an article comprising a substrate, which is prepared, coated, bonded, sealed, or printed with the aqueous polyurethane-urea dispersion comprising polyurethane-urea according to claim 1.

14. A printing method comprising the following steps: applying the aqueous polyurethane-urea dispersion comprising polyurethane-urea according to claim 1 onto a surface of a substrate, and then curing.

15. A printed product comprising a substrate and a coating formed by applying the aqueous polyurethane-urea dispersion comprising polyurethane-urea according to claim 1 onto the substrate.

* * * * *